"Patented May 18, 1943"

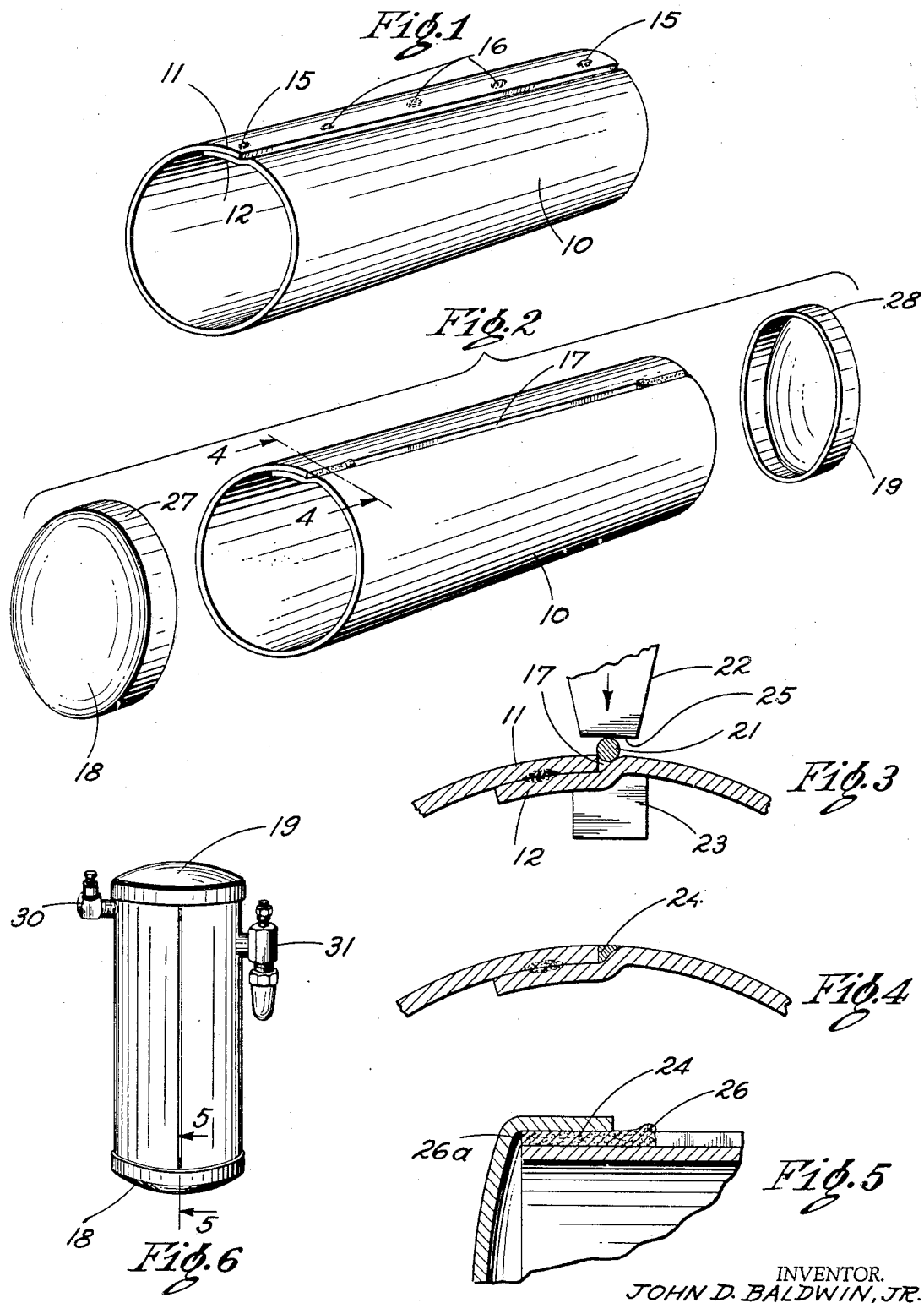

UNITED STATES PATENT OFFICE 2,319,487

TANK AND METHOD OF MAKING SAME

John D. Baldwin, Jr., Los Angeles, Calif., assignor to The Weatherhead Company, Cleveland, Ohio, a corporation of Ohio Application October 28, 1940, Serial No. 363,118

8 Claims. (Cl. 29—148.2)

This invention relates to tanks and methods of making the same and the invention is described herein with particular reference to receiver tanks for refrigeration systems, but it is to be understood that devices made according to my invention may be of various designs and adapted to many different purposes. Tanks embodying my invention are especially useful wherever a fluid container that is light, strong, leakproof and economical of manufacture may be required.

It has heretofore been proposed to manufacture tanks and other similar articles or devices by welding several ferrous parts together, for example, in the case of tanks, end members are welded to a central tubular portion. The welding has been accomplished by means of the well-known copper brazing process wherein the parts are pressed or otherwise held firmly together, copper is supplied to the contacting surfaces of the parts and the assembly passed through a furnace having a controlled atmosphere of hydrogen or other reducing gas and heated to a temperature of about 2150° F. Under these conditions the copper becomes fluid and alloys with the underlying ferrous material and functions to bond the parts together, forming strong and leakproof joints.

Tanks so produced have been successful but have been rather expensive of manufacture for the copper brazing process requires a close and accurate fit between the parts which are to be brazed together and the necessity for the close fit between the end caps and the central tubular portions of the tank has heretofore required that the central tubular portion be made of relatively expensive seamless or butt welded tubing.

It is among the objects of my present invention to provide tanks and similar devices having the structural advantages of the devices described above but which can be manufactured at much less cost. Another object is to provide a method of making such devices. A further object is to provide a tank wherein the body of the tank is provided with a lapped seam with the portions of the seam adjacent the ends of the body portion formed to present smooth peripheral surfaces so that closure members may be secured thereto by copper brazing or similar methods. Another object of the invention is to provide a method of filling in a groove or recess to form a smooth surface suitable for copper brazing and similar operations. A further object of the invention is to provide a tank that is light, strong, durable, leakproof and economical of manufacture.

According to a preferred form of my invention as applied to the manufacture of tanks, I accomplish the above and other objects by making the body portion of the tank by rolling a ferrous sheet material into cylindrical form with a lapped seam. The sheet is held in cylindrical form by a few spot welds along the seam and then the grooves or recesses at the seam adjacent the ends of the cylinder are filled by deforming and welding a piece of ferrous wire into the grooves to fill the grooves and provide smooth peripheral surfaces upon which the end members of the tank may be secured. The end members are preferably formed of light stampings of ferrous material and are pressed onto the tank. Then the tank is completed by supplying copper to the contacting surfaces along the seam of the body portion and between the body portion and the end members and heating the assembly to brazing temperature in the proper atmosphere simultaneously to braze the longitudinal seam of the body portion and the caps to the ends of the body portion.

Referring to the drawing in which a preferred form of my invention is illustrated, Fig. 1 is a perspective view showing the body portion rolled into cylindrical form and held in position by spot welds; Fig. 2 is a perspective view showing the body portion with the grooves in the seam filled in and the caps in position ready to be assembled therewith; Fig. 3 is a somewhat diagrammatic illustration of the operation of filling in the groove at the ends of the body portion of the tank; Fig. 4 is a fragmentary section showing the appearance of the ends of the body portion after the groove has been filled in, the section being taken along line 4—4 of Fig. 2; Fig. 5 is a fragmentary section of the completed device on enlarged scale as indicated by the line 5—5 of Fig. 6; and Fig. 6 illustrates a completed tank embodying my invention.

As shown in Fig. 1 the body portion 10 of the tank may be formed by rolling a sheet of thin ferrous material into cylindrical form. Preferably one edge 11 is curved to conform to the ultimate cylindrical shape of the body portion and the other edge is curved and offset as at 12 before the rolling operation. The rolled sheet metal is then placed over a sizing form and brought to the proper diameter, and while so held the overlapping portions 11 and 12 are spot welded at each end as indicated diagrammatically at 15 to hold the body portion to the correct diameter. Thereafter the overlapping portions may be spot welded at spaced intervals along the seam as indicated at 16. By these steps the body portion can be easily formed to fit accurately the end caps 18 and 19; the caps, preferably being stampings, can be held to close tolerances.

The character of the seam formed by lapping the ends of the sheet over one another necessarily leaves a groove 17 between the edge portion 11 and the offset portion 12. The ordinary operations of cutting the sheets are such that there are necessarily variations in the dimensions of the sheets so that the groove 17 will vary in size, although, as noted above, the diameter of the body portion may be maintained with a high degree of accuracy. Obviously, a good copper brazed joint cannot be made between the pressed metal caps 18 and 19 and the body portion 10 so long as the groove 17 is present, as copper brazing and similar processes require close contact and only capillary spaces between the parts to be joined.

According to my invention, I eliminate the difficulties noted above and fill the grooves in the tank bodies to provide smooth surfaces for engagement with the end caps or closures by spot welding small pieces of iron wire at each end of the seam to fill up the recesses in the outside of the seam. This operation is shown diagrammatically in Fig. 3, the wire 21 being positioned above the groove 17 and being engaged by the electrode 22, the other electrode 23 extending within the cylindrical body portion and being formed to support the metal of the tank. When the current is turned on and pressure applied by the electrodes the wire 21 is fused and pressed into the groove 17 to completely fill the groove and to provide a smooth surface as indicated at 24 in Figs. 2, 4 and 5. In carrying out the operation, the electrode 22 is provided with a concave cylindrical surface as at 25, conforming to the curve of the cylindrical body portion and the wire is of sufficient size to supply enough metal to fill the largest groove that will be encountered within the tolerances established for the size of the sheet and the diameter of the cylinder. With tank bodies having grooves smaller than the maximum the electrodes will extrude any excess metal of the wire axially of the tank and along the groove as shown for example at 26, so that with all sizes of groove a smooth flush surface will be produced. Preferably any excess metal is removed from the finished tank, for the sake of appearance. Any metal that may be extruded beyond the end of the tank is also preferably removed, leaving a smooth surface as at 26a, these operations may be carried out readily by means of a grinding wheel.

The operation of filling the grooves can be carried out very rapidly in an ordinary spot welding machine and after this operation has been completed the caps 18 and 19 may be placed in position on the body portion and copper supplied to the contacting parts by any convenient means, for example by small copper wires disposed around the body portion adjacent the ends of the flanges 27 and 28 of the caps 18 and 19 and within the groove 17. If desired, inlet and outlet valves 30 and 31 may likewise be secured to the tank by copper brazing. In carrying out the copper brazing, the complete assembly, including the body portion, caps and valves, if desired, is passed through the brazing furnace. All of the brazed connections are thus formed simultaneously, the copper fusing and alloying with the adjacent ferrous surfaces to form strong and leakproof alloy bonds between all of the contacting surfaces. Obviously, other furnace brazing methods, utilizing different brazing metals may be employed if desired.

From the foregoing description of a preferred form of my invention, it will be evident that tanks and similar devices made according to my invention are economical of manufacture inasmuch as the necessity for expensive materials is eliminated. My method permits the use of ordinary lapped seams in conjunction with copper brazing and other furnace brazing methods and can be adapted to ordinary manufacturing operations without requiring unusual care or close tolerances. My method is particularly efficient as the tank seam can be completed by the same brazing operation that secures the caps to the tank body and with practically no additional cost. The method of filling grooves by spot welding makes it possible to produce smooth surfaces for brazing without requiring any great degree of accuracy in the manufacture of the tank itself. Those skilled in the art will appreciate that the method disclosed herein may be adapted to the brazing of other articles or devices wherein irregular surfaces or grooves are encountered.

In the foregoing specification I have described a preferred form of my invention by way of example. Those skilled in the art will appreciate that various modifications and changes can be made both in the article and method and that my invention can be adapted to devices other than the tank specifically described herein. Therefore, it is to be understood that my patent is not limited to the preferred form of invention described herein or any manner other than by the appended claims when given the range of equivalents to which my patent may be entitled.

I claim:

1. A tank embodying a sheet of ferrous metal having a curved and offset portion extending along one edge thereof, the opposed edge of said sheet being secured to the offset portion to provide a hollow body having a lapped seam presenting a groove extending along the seam, means composed of ferrous material disposed in said groove for filling the same and providing smooth surfaces on said body adjacent the ends thereof, and ferrous closure members closely engaging the ends of said body and said filling means and copper brazed thereto.

2. A tank comprising a hollow cylindrical ferrous body portion having a lap seam presenting a longitudinally extending groove, ferrous wires welded within said groove adjacent the ends of said body portion and presenting surfaces flush with adjacent surfaces of said body portion, and caps composed of ferrous material having cylindrical flanges contacting the ends of said body portion and the surfaces of said wires, said caps being copper brazed to said body portion and said seam being copper brazed to provide fluid tight connections between said body portion and said caps and along said seam.

3. In combination, a ferrous member having a smooth surface having a groove or recess therein, a ferrous filler welded into and filling said groove or recess for a portion of its length and presenting a smooth surface flush with the smooth surface of said first member, and a second ferrous member having a smooth surface disposed in contact with said first member and said filler and copper brazed thereto.

4. That method of forming a tank which comprises, deforming an edge of a sheet of ferrous metal, overlapping the opposed edge of said sheet to the deformed edge to provide a seam, compressing a ferrous wire within the recess between the deformed portion and said overlapped edge to form a smooth surface in said sheet, and thereafter copper brazing a ferrous cap to an end of said sheet and engaging said smooth surface.

5. That method of forming a tank which comprises, offsetting an edge of a sheet of ferrous metal, rolling said sheet into cylindrical form, the opposite edge of the sheet overlapping the offset portion to provide a seam, filling the recess between said curved portion and the overlapping edge adjacent the ends of the cylindrical sheet with a ferrous material to provide smooth peripheral surfaces at the ends thereof and thereafter copper brazing ferrous closure members to the smooth peripheral surfaces and simultaneously copper brazing said seam.

6. That method of forming a tank which comprises, cutting a sheet of ferrous metal to proper length and width, offsetting and curving an edge of said sheet, curving the opposite edge of the sheet, rolling the sheet into cylindrical form with the curved edge overlapping the offset portion of the offset and curved edge, thereby providing a lap seam with a longitudinally extending groove adjacent the offset portion, bringing said cylinder to the desired diameter over a sizing form, spot welding said overlapped edges to hold the cylinder to the said desired diameter, positioning ferrous wires along said groove adjacent the ends of the cylinder, spot welding said wires into said groove and during the spot welding operation deforming said wires to provide smooth surfaces thereon substantially flush with the adjacent surfaces of said sheet, thereby providing the ends of said sheet with substantially smooth cylindrical surfaces, and simultaneously copper brazing caps composed of ferrous material to said smooth cylindrical surfaces and copper brazing the overlapping edges of said cylinder together.

7. That method of forming a tank which comprises, forming a ferrous sheet into a hollow body with a lap seam presenting a longitudinally extending groove, spot welding said lap seam to hold said body to the desired size, positioning a piece of ferrous wire along the groove at one end of the body, spot welding said wire into said groove and during the spot welding operation deforming said wire to provide a smooth surface thereon substantially flush with the adjacent surfaces of said sheet, thereby providing the end of said sheet with a continuous, smooth surface, and copper brazing a cap composed of ferrous material to said smooth surface.

8. The method of making a fluid-tight bond between surfaces of two ferrous parts, the first part having a substantially smooth surface and the second part having a groove or recess in a surface which is otherwise adapted to substantially coincide with the smooth surface of said first part; which method includes the steps of positioning a filler of ferrous material adjacent said groove or recess, said filler having a shape different from the shape of said groove or recess, simultaneously welding and deforming said filler into said groove or recess to cause said filler to conform thereto and to provide said filler with a surface which is substantially smooth and flush with adjacent surfaces of said second part, assembling said first and second parts with the smooth surface of said first part contacting the smooth surface of said filler and adjacent surfaces of said second part, and brazing said parts together by supplying brazing metal to said contacting surfaces, and thereafter heating the assembly to brazing temperature in a controlled atmosphere to produce a fluid-tight alloy bond between said surfaces.

JOHN D. BALDWIN, Jr.